UNITED STATES PATENT OFFICE.

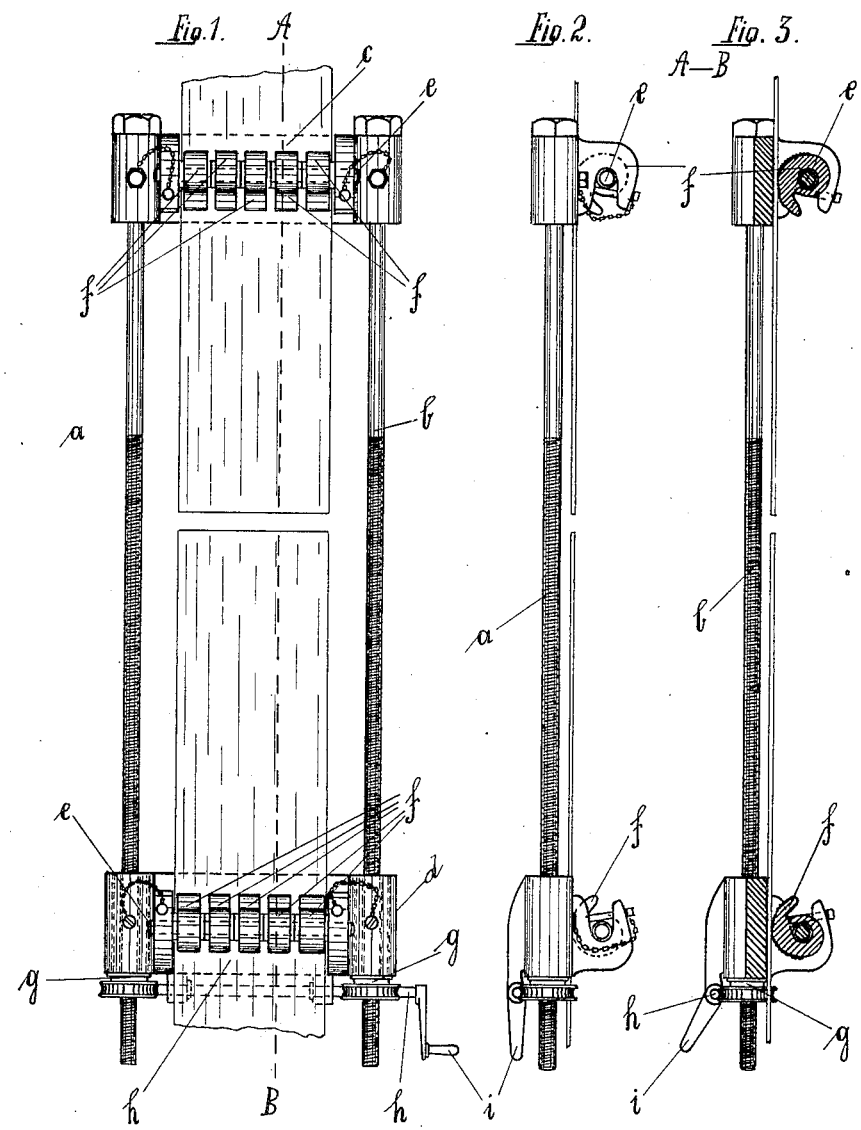

GUSTAV H. ERMISCH, OF LEIPZIG, GERMANY.

BELT-STRETCHER.

1,084,139.   Specification of Letters Patent.   Patented Jan. 13, 1914.

Application filed December 4, 1911.   Serial No. 663,784.

*To all whom it may concern:*

Be it known that I, GUSTAV HERMANN ERMISCH, a subject of the King of Saxony, residing at Leipzig, in the Kingdom of Saxony, Germany, have invented certain new and useful Improvements in Belt-Stretchers, of which the following is a specification.

This invention relates to a belt stretcher the construction of which is improved in such a manner that the well known clamping member of the stretcher is composed of several independent parts mounted upon a common transverse axle.

This improved belt stretcher offers the advantage that even such belts as are uniformly stretched upon the entire width which, having been required, are not of uniform thickness.

In the accompanying drawings the invention is shown by way of example.

Figure 1 is an elevation of the improved belt stretcher. Fig. 2 is a side view of the same. Fig. 3 is a section on line A—B of Fig. 1.

The belt stretcher essentially consists of two threaded spindles $a$, $b$ upon which two clamping devices $c$, $d$ are mounted in such a manner that their position the one with regard to the other can be regulated. Each clamping device comprises a clamping member composed of several clamping fingers $f$, which are mounted upon a transverse axle $e$, so that they can move independently the one from the others.

The position of the clamping device $d$ upon the spindles $a$, $b$ is regulated by means of a screw spindle $h$ which meshes with worm wheels $g$ which have a threaded boring and are screwed upon the threaded spindles $a$, $b$ and fixed to the sleeves of the clamping device $d$ so that, when the screw spindle $h$ is being revolved by means of the crank handle $i$, the two worm wheels $g$ mount or descend upon the threaded spindles $a$, $b$ and move the clamping device $d$ toward the clamping device $c$ or away from the same.

I claim:—

A belt stretcher comprising in combination two threaded spindles and two clamping devices of which one is fixed upon the one end of said spindles, the other being movably mounted upon the threaded part of said spindles, each of said clamping devices consisting of two lateral sleeves, of a transverse axle and of several independent clamping fingers loosely mounted upon said transverse axle, and means for varying the position of the movable clamping device upon said spindles, substantially as described and shown and for the purpose set forth.

In witness whereof I have hereunto set my hand in the presence of two witnesses.

GUSTAV H. ERMISCH.

Witnesses:
 PAUL HANSCHKE,
 RUDOLPH FRICKE.

Copies of this patent may be obtained for five cents each, by addressing the "Commissioner of Patents, Washington, D. C."